United States Patent [19]

Bronkema et al.

[11] 4,190,408
[45] Feb. 26, 1980

[54] AUTOMATIC LOADING AND UNLOADING APPARATUS FOR PRESS

[75] Inventors: James W. Bronkema, Grand Rapids; Norman L. Hoeksema, Zeeland, both of Mich.

[73] Assignee: Unique Tool & Die Co., Grand Rapids, Mich.

[21] Appl. No.: 919,155

[22] Filed: Jun. 26, 1978

[51] Int. Cl.² ............................................. B29C 17/00
[52] U.S. Cl. .................... 425/145; 425/397; 425/398; 425/DIG. 48
[58] Field of Search ............... 425/145, DIG. 48, 397, 425/403.1, 110, 123; 294/61

[56] References Cited

U.S. PATENT DOCUMENTS

| | | | |
|---|---|---|---|
| 2,777,184 | 1/1957 | Monk et al. | 425/123 |
| 2,831,213 | 4/1958 | Klarmann et al. | 425/397 X |
| 3,914,103 | 10/1975 | Dean et al. | 425/397 |
| 3,981,669 | 9/1976 | Gambill et al. | 425/397 |
| 4,015,872 | 4/1977 | Toznok et al. | 294/61 |
| 4,088,718 | 5/1978 | Mulvany | 425/145 X |
| 4,150,930 | 4/1979 | Asano | 425/145 |

Primary Examiner—J. Howard Flint, Jr.
Attorney, Agent, or Firm—John A. Waters

[57] ABSTRACT

Apparatus for automatically loading and unloading a press having vertically movable die halves comprises a frame positioned adjacent the press, a movable carriage mounted in the frame for longitudinal movement toward and away from the press, and a blank holding table mounted in the movable carriage for rotation about a horizontal axis, with a gripping mechanism for holding blanks being mounted on one side of the table and a nesting device for holding finished products being mounted on the other side of the table. The gripping mechanism holds blanks in a position that duplicates the charge placement pattern in the mold. The apparatus is operated by a control mechanism such that after blanks are placed in the gripping mechanism, the gripping mechanism is actuated to hold them to the table and the table is turned upside down. The table is then extended to a position between the separated halves of the die, and the gripping mechanism is released, causing the blanks to be transferred to the lower mold cavity. At the same time finished products are ejected from the upper die half and dropped down onto the nesting device. The table is then retracted from the press so that the finished products can be removed and the table can be turned right side up and reloaded for a subsequent cycle.

13 Claims, 16 Drawing Figures

AUTOMATIC LOADING AND UNLOADING APPARATUS FOR PRESS

BACKGROUND OF THE INVENTION

1. Field of the Invention

This invention relates to apparatus for automatically loading and unloading a press and more particularly a compression press, which eliminates the necessity for an operator to place his hands between the separated die halves of the press.

2. Description of the Prior Art

A compression press is used to form parts by compressing a blank or charge of unformed material between a pair of movable die halves including male and female mold cavities. One application of such a compression press is in the formation of fiberglass parts wherein unformed blanks having a board-like consistency are laid in the mold and compressed under heated conditions in order to form a finished product. The die halves are then separated, with the finished product typically being retained on the upper die half as the die halves are separated. The finished product is then removed from the upper die half and the compression press reloaded for a subsequent operation.

Loading and unloading a compression press manually involves a significant hazard of having the press close accidentally on the operator's hands or body. New safety requirements make it very desirable to eliminate this hazard from operating conditions.

Some attempts have been made to design automatic loading and unloading devices for presses and the like wherein unformed materials are loaded into presses. One example of such a device is shown in Loznak et al U.S. Pat. No. 4,015,872, which provides for automatic loading and unloading of blanks by means of a spear-like impaling mechanism that moves inwardly and outwardly into and out of the die cavity.

It is an object of the present invention to provide an improved automatic loading and unloading mechanism for a press that is particularly adapted to handling the boardlike blanks or charges used in forming fiberglass parts.

SUMMARY OF THE INVENTION

The present invention comprises apparatus for automatically loading and unloading a compression press wherein finished products are formed by compressing blanks between upper and lower die halves that are vertically movable with respect to each other to open and close the die. The apparatus comprises a frame adapted to be positioned adjacent to the press and a blank holding mechanism pivotably mounted in the frame for rotation about a horizontal axis through an angle of at least 180 degrees. The blank holding mechanism includes a releasable gripping mechanism for engaging and holding the blanks when they are laid on the blank holding means, such that the blanks are releasably retained in place on the blank holding mechanism when the blank holding mechanism is rotated so as to be turned upside down. The blank holding mechanism also is longitudinally movable with respect to the frame between a retracted position, wherein the blank holding mechanism is withdrawn from the press, and an extended position, wherein the blank holding mechanism is extended to a position between the separated halves of the die in alignment with the mold cavities in the die. The apparatus further includes a control mechanism for turning the blank holding means upside down when loaded with uncompressed blanks and extending the loaded blank holding mechanism into its extended position in alignment with the mold cavities in the die halves when the die halves are separated. The control means then releases the gripping mechanism such that the blanks drop onto the lower die half in position to be compressed, the control means thereafter withdrawing the blank holding mechanism to its retracted position and turning the blank holding mechanism right side up for receipt of additional unformed blanks.

The blank holding mechanism on its underside includes a nesting device for receiving finished products from the upper die half when the blank holding mechanism is turned upside down. Thus, when the blank holding mechanism is in its extended position, finished products are received in the nesting device at the same time that unformed blanks are dropped into position in the die cavity. After retraction of the blank holding mechanism, the finished products can be manually removed from the nesting device before the blank holding mechanism is turned right side up for loading with additional blanks.

The gripping mechanism includes pneumatic clamps for holding the blanks to the blank holding mechanism, with the clamps being operated by a pneumatic cylinder through a rotatable linkage mechanism. Desirably, the blank holding mechanism includes a pneumatic ejection device for physically forcing the blanks out of the holding mechanism and downwardly into the die cavity in the lower die half. A gripping mechanism for holding blanks in a vertical position comprises downwardly and inwardly tapered side walls, with the blank being wedged between the side walls to hold it in place.

With the apparatus of the present invention, the necessity for an operator to physically reach into the die cavity between separated die halves is eliminated, with the whole operation being performed simply and automatically.

These and other features and advantages of the present invention will hereinafter appear, and, for purposes of illustration, but not of limitation, an exemplary embodiment of the present invention is described below and shown in the attached drawings.

BRIEF DESCRIPTION OF THE DRAWINGS

FIGS. 12-16 are schematic figures showing the operation of the present invention, with FIG. 12 showing a loaded blank holding mechanism in its retracted position.

DETAILED DESCRIPTION OF THE PREFERRED EMBODIMENT

Figure 1:
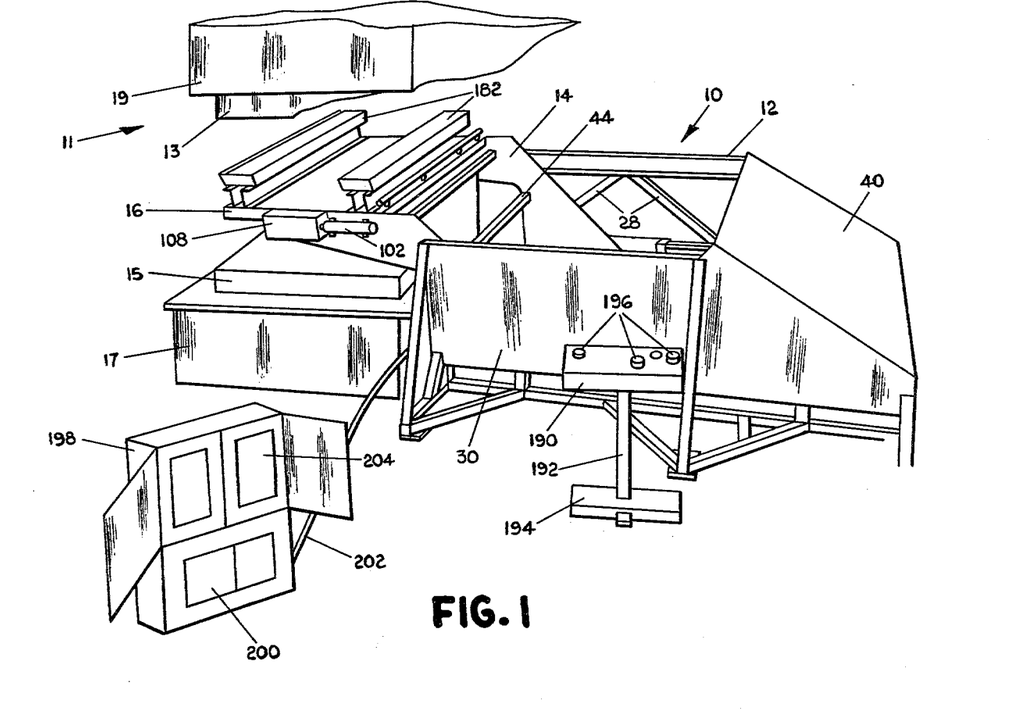
FIG. 1 is a perspective view of the automatic loading and unloading apparatus of the present invention, shown in operation in connection with a compression press.

Referring now to the drawings, automatic loading and unloading apparatus 10 constructed in accordance with the present invention is shown in operation in conjunction with a compression press 11 in FIG. 1. Compression press 11 includes an upper die half 13 and lower die half 15 including male and female mold cavities. The lower die rests on a stationary table 17, while the upper die is affixed to a movable platen 19. The movable platen is movable by means of a hydraulic drive cylinder or the like to open and close the die. The dies are heated in a conventional manner for formation of fiberglass parts through a combination of pressure and heat.

Figure 2:
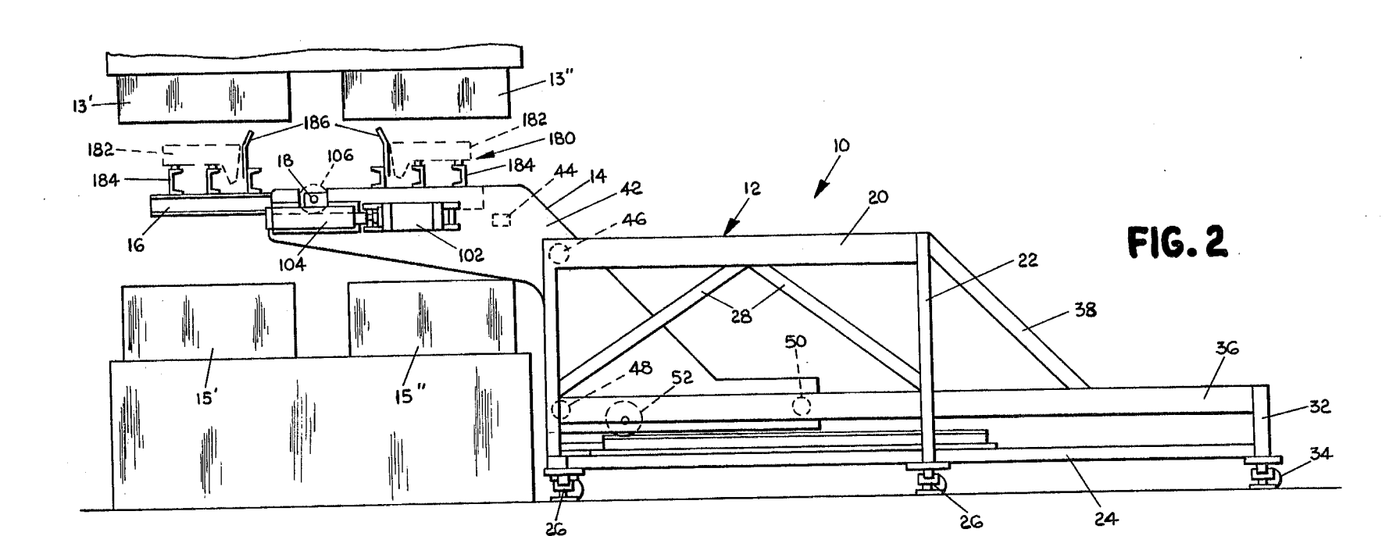
FIG. 2 is a side elevational view of the present invention, with the blank holding means being shown in its extended position.

Referring to FIG. 2, loading and unloading apparatus 10 comprises a stationary frame 12, a movable carriage 14 mounted in the frame, and a blank or charge holding mechanism 16 rotatably mounted on the movable carriage for rotation about a horizontal axis on axle 18.

Frame 12 comprises a pair of inwardly facing channel members 20 positioned on each side of the frame. Channel members 20 are mounted on legs 22 to a base rail 24. The base rail rests on feet 26. Angular struts 28 reinforce the sides of the frame. Panels 30 (shown in FIG. 1 but removed for purposes of description in FIGS. 2 and 3) enclose the sides of the frame.

Base rails 24 extend rearwardly or to the right (FIG. 2 orientation substantially further than the right hand end of channel members 20 and terminate at a shorter leg 32 and foot 34. A pair of lower inwardly facing channel members 36 having a vertical back 37 and upper and lower horizontal flanges 39 and 41 (see FIG. 6) are positioned toward the bottom of the frame and extend parallel to upper members 20. Lower channel members 36 are attached to legs 32 and 22 and are reinforced by means of an angular brace 38. A shield 40 (shown in FIG. 1 but shown removed for description purposes in FIGS. 2 and 3) encloses the rear or right hand end of the frame mechanism.

Movable carriage 14 comprises a pair of spaced support members or plates 42, which have a generally Z-shaped configuration. The plates are held in a vertical position and spaced an equal distance apart by means of cross members 44. The movable carriage is mounted in the frame by means of a plurality of wheels rotatably mounted on the outside surface of support plates 42. Upper wheels 46 on the support plates ride along the horizontal flanges inside channel members 20 while lower front wheels 48 and lower rear wheels 50 ride along the interior of channel members 36. These wheels make it possible for the movable carriage to move longitudinally in a horizontal direction with respect to the frame while restraining the movable carriage from any other movement or from a tipping movement with respect to the frame.

Figure 5:
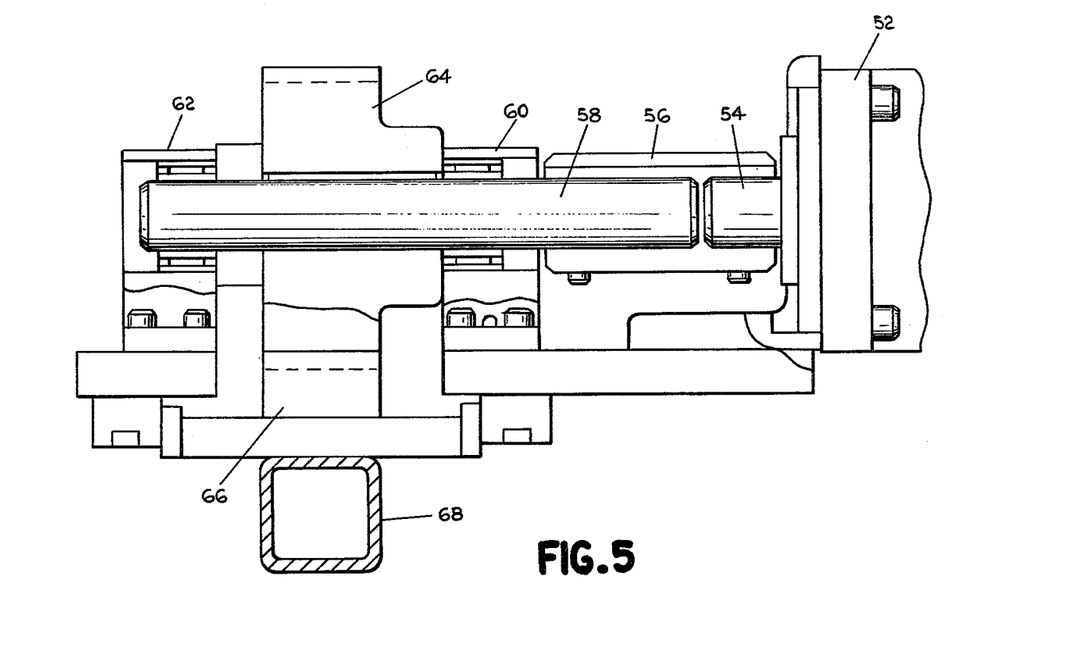
FIG. 5 is a partial sectional view taken along line 5—5 of FIG. 3.

The movable carriage is moved along the frame by means of a hydraulic extend drive motor 52 mounted in a centered position between support plates 42 at the bottom of the movable carriage. As shown in detail in FIG. 5, drive motor 52 has an output shaft 54 coupled by coupler 56 to shaft 58, which is journaled in bearings 60 and 62. Between the bearings, a gear member 64 in the form of a pinion gear is non-rotatably mounted on the shaft. Pinion gear 64 engages a rack gear 66 mounted in a horizontal position on a longitudinal support member 68 at the bottom of the frame, spaced approximately half way between the sides of the frame. With the rack being mounted in a fixed position in the frame, operation of the drive motor 52 causes rotation of pinion gear 64, and this produces longitudinal movement of the movable carriage from a retracted position, shown in FIG. 3 (although not quite fully retracted in that picture), to a fully extended position, shown in FIG. 2.

Figure 6:
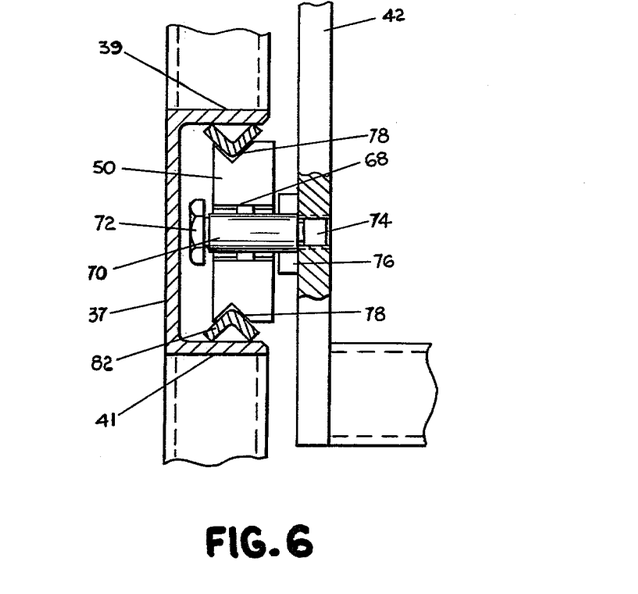
FIG. 6 is a partial sectional view taken along line 6—6 of FIG. 3 and showing the roller mechanism for extending and retracting the blank holding mechanism of the present invention.

The details of the roller mounting mechanism for mounting the movable carriage in the frame are shown in FIG. 6. Although the structure shown is wheel 50, it should be noted that the wheel construction and manner in which the wheels ride in the inwardly facing channels are substantially the same for all of the wheels. Wheel 50 is mounted by means of bearing 68 on an axle 70 having a hex head 72 and threaded inner end 74. A washer 76 separates the wheel from support plate 42. The outer surface of wheel 50 includes a groove 78 that mates with V-shaped channel members 80 and 82 running along the upper and lower surfaces of the channel member respectively. The V-shaped channel members and the V-shaped groove in the wheels cause the wheels to remain in a precise longitudinal position in the frame.

Figure 7:
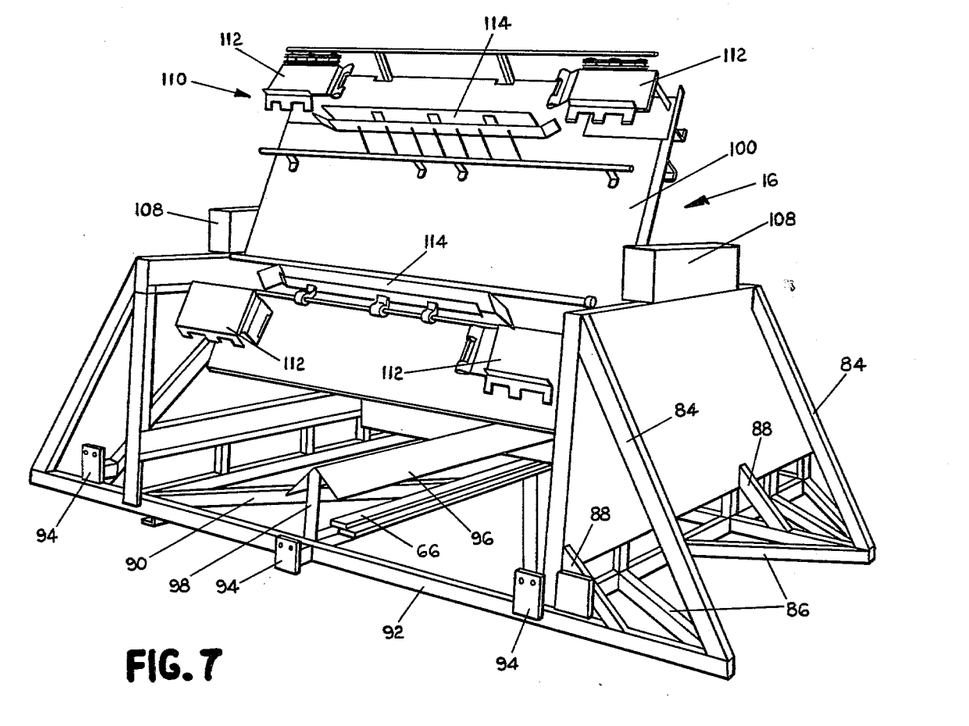
FIG. 7 is a perspective view of the present invention showing the blank holding mechanism in the process of being rotated 180 degrees to an upside down position.

As shown in more detail in FIG. 7, the sides of the frame are supported by angular support members 84 that extend downwardly from the top of the frame to outwardly extending braces 86 at the bottom of the frame. Separate angle brackes 88 support the outwardly extending member 86. Also, angular horizontal cross braces 90 extending between the inward channels of the bottom of the frame provide additional buttressing for the frame structure. The front edge of the frame adjacent the compression press includes a cross member 92. A plurality of mounting plates 94 are positioned along the front edge of the frame in order to bolt the frame in a fixed position to the compression press. A downwardly facing V-shaped shield 96 mounted on legs 98 extends the length of the rack and pinion gear mechanism and shields the mechanism from debris or the like that could fall downwardly from the machine.

Blank or charge holding mechanism 16 comprises a generally flat table or platform 100 pivotably mounted on pivot axle 18. Rotation of the table is caused by a hydraulic cylinder 102 actuating a gear rack 104 that interacts with a pinion gear 106 mounted on axle 18. Pinion gear 106 is mounted in a fixed position on axle 18, so that when hydraulic cylinder 102 actuates gear rack 104, the gear 106 rotates and causes the table to rotate. These elements are enclosed within a housing 108 shown in FIG. 7. Separate drive mechanisms of the same type can be provided on each side of the table.

Figure 3:
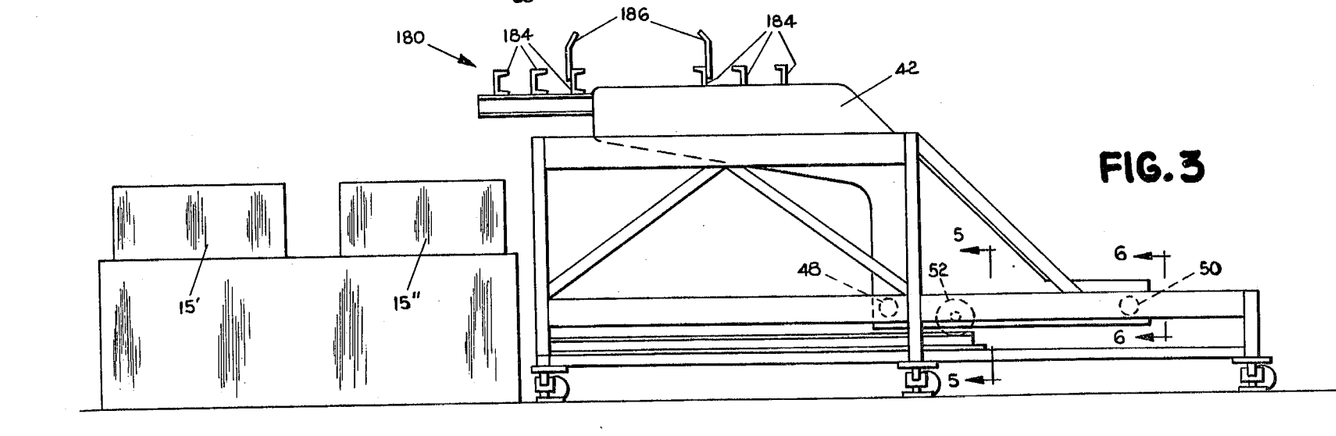
FIG. 3 is a side elevational view of the present invention, with the blank holding means being shown in its retracted position.
Figure 4:
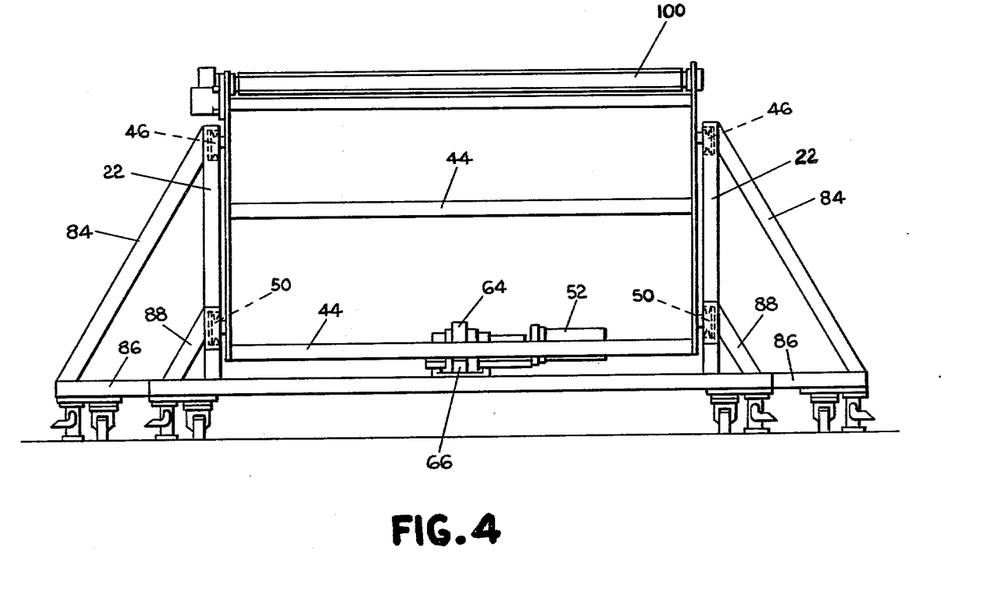
FIG. 4 is an end elevational view of the present invention.

One side of the table (the upper side when the table is right side up) includes a gripping or clamping mechanism 110 of the present invention. In the illustrated embodiment, the clamping mechanism includes sufficient clamping elements to hold blanks or charges for two separate die cavities. As illustrated in FIGS. 2 and 3 die 15 is actually two separate dies 15' and 15", each of which is identical and each of which has a separate mold cavity. Upper dies 13' and 13" correspond with the lower dies in this case. Two separate dies can be employed to make two separate parts simultaneously in this illustration.

Referring back to FIG. 7, the particular type of product being made is a fiberglass product wherein the die requires rectangular charges or blanks of fiberglass in a horizontal position at each end of the die and a vertical elongated charge extending between the horizontal portions of the charge at one edge thereof. This configuration is particularly adapted to a particular type of front end assembly for a motor vehicle.

Figure 8:
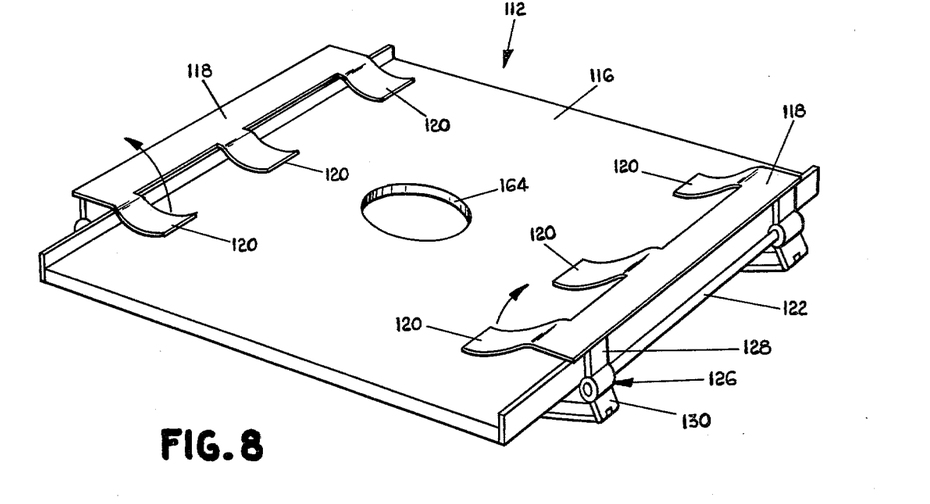
FIG. 8 is a perspective view of the blank gripping mechanism of the present invention.
Figures 9, 10, 11:
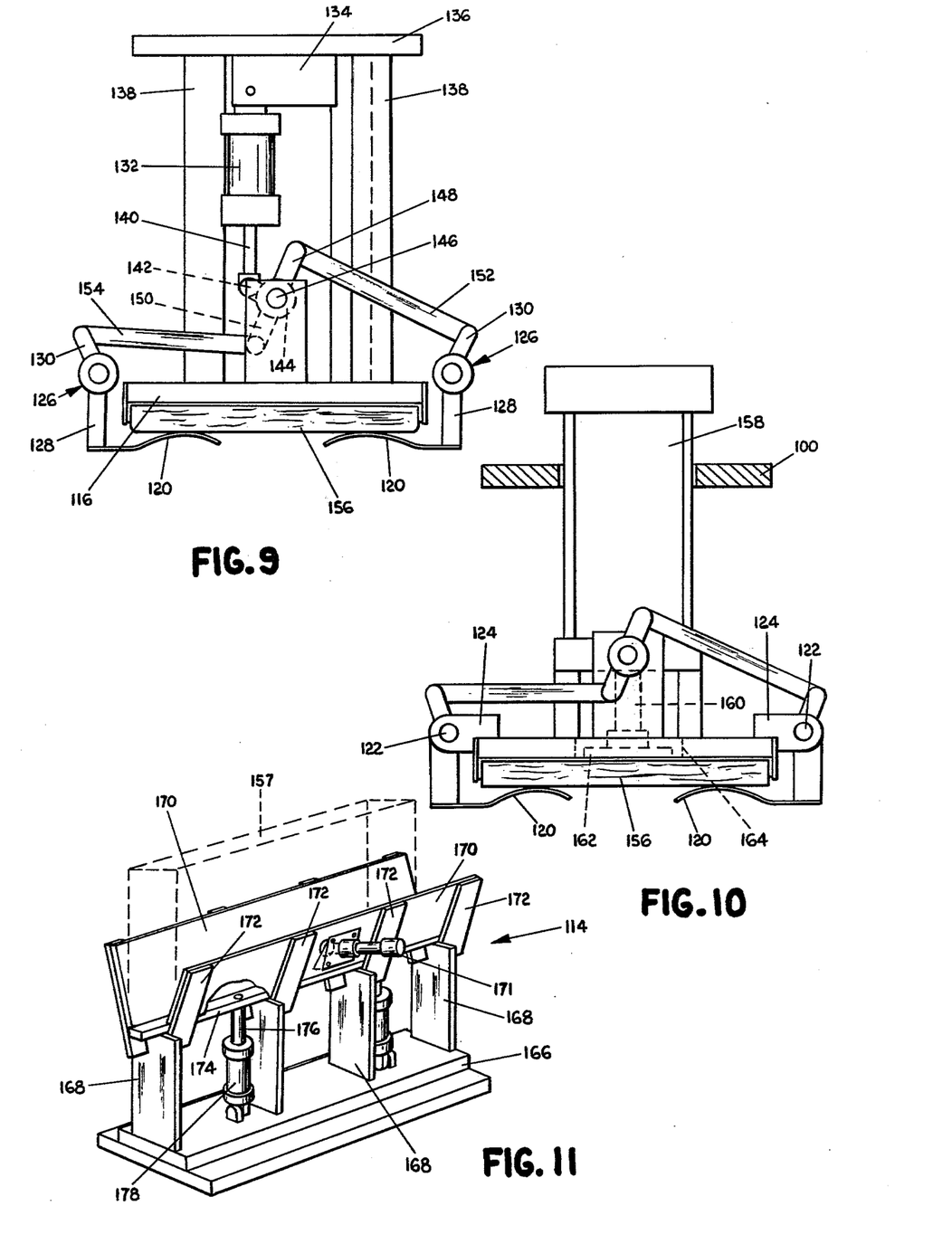
FIG. 9 is a side elevational view of the blank gripping mechanism of the present invention showing the drive linkage for opening and closing the clamps.
FIG. 10 is a side elevational view of the blank gripping mechanism of the present invention showing the charge ejector cylinder employed with the clamping mechanism of the present invention.
FIG. 11 is a perspective view of the gripping mechanism for holding charges in a vertical position in the holding mechanism of the present invention.

Clamping mechanism 112 for holding horizontal charges or blanks in place is shown in FIG. 8, 9 and 10, while the gripping mechanism 114 for holding the vertically oriented charges is shown in FIG. 11. Clamping mechanism 112 includes a horizontal base plate 116 and clamping members 118 mounted on opposite sides of the base plate. Clamping members 118 include a plurality of Teflon-coated clamping fingers 120 extending outwardly from the side of the clamping members along the length thereof. The clamping fingers are shaped concavely so as to smoothly engage the charge. The clamping members are pivotably mounted on rods 122, which are attached to the base plate by means of flanges 124 (see FIG. 10). Each clamping member is attached to a rod 122 by means of a pair of pivot links 126 mounted on the ends of the rod, with the pivot links including an opening in the center for the rod, an upwardly extending arm 128 that attaches to the clamping members and a lower arm 130 that extends downwardly (FIG. 8 orientation).

The manner in which the clamping members are opened and closed is shown in FIG. 9. A pneumatic drive cylinder 132 is mounted at one end in an axially stationary position to a mounting bracket 134, which in turn is attached to a mounting plate 136, with the mounting plate being attached to base plate 116 by arms 138. Plate 136 is fastened to table 100. In the views shown in FIGS. 9 and 10, the table is in an upside down position.

Drive cylinder 132 has an output shaft 140, which is in turn attached to one end of link 142. The other end of link 142 is attached to a sleeve 144 journaled on a shaft 146. Arms 148 and 150 are also attached to sleeve 146 such that rotation of the sleeve rotates link 142 and arms 148 and 150 simultaneously. The outer end of link 148 is pivotably attached to an arm 152 which is in turn pivotably attached to arm 130 of pivot link 126. The outer end of arm 150 is attached to an arm 154 which again is pivotably attached to the arm 130 on the opposite side of the plate.

The clamping mechanism is opened and closed by extending and retracting output shaft 140 of pneumatic drive cylinder 132. When the shaft is extended, sleeve 144 rotates in a counterclockwise direction (FIG. 9 orientation) and this causes the clamping fingers to open, permitting the charge to drop downwardly into the die cavity. When the output shaft of the drive cylinder is retracted, the opposite occurs, namely, the linkage rotates the clamping members to a closed position on a charge 156 placed on base plate 116.

FIG. 10 shows another feature of the present invention for enhancing the transfer of the charge from the blank holding mechanism to the mold cavity in the die. A center ejector cylinder 158 is mounted to table 100 in a fixed position and includes an output shaft 160 having a flared end 162 or a ram formed on the outer end thereof. The flared end fits through an opening 164 in base plate 116. When ejector cylinder 158 is actuated to extend output shaft 160, the flared end 162 pushes the charge downwardly into the mold cavity forcing the charge to become embedded in the mold cavity more positively than would occur under a simple gravity feed.

The structure of gripping mechanism 114 for holding vertical charges 157 in position on table 100 is shown in FIG. 11. Gripping mechanism 114 includes a double layer base plate 166 and upstanding support plates 168 extending upwardly therefrom. A pair of downwardly and inwardly tapered gripping plates 170 are mounted on the upper end of plates 168 by means of mounting arms 172 spaced along the length of plate 170. Plates 170 are fastened by screws or the like to mounting arms 172. Plates 170 are positioned and tapered in such a manner that a vertical charge 157 placed downwardly into the generally V-shaped cavity between the plates becomes wedged between the plates so as to be retained in position. A pneumatic side acting clamping mechanism 171 mounted on plate 170 reinforces the holding action by positively clamping the charge between the plates 170. A bar 174 extends along the length of the V-shaped cavity between plates 170 at the bottom thereof. The bar is mounted on the ends of the output shafts 176 of a pair of pneumatic drive cylinders 178 pivotably mounted at their lower ends to the top of mounting plate 166. Upon actuation of the ejector cylinders 178, output shafts 176 are extended, thus forcing the charge out of the V-shaped cavity between the plates. This action, as with the horizontal charge clamping mechanism, causes the charge to be positively transferred and pushed into the mold cavity in the die.

On the side of the table or platform 100 opposite from the clamping mechanism described above is a nesting device 180 for receiving and holding finished parts 182 after they have been ejected downwardly from the upper die member by means of suitable ejector pins incorporated into the die (these elements being conventional). Nesting device 180 includes an appropriately formed structure to hold the finished product on the top of the table until the movable carriage can be retracted out of the space between the open die halves. In the illustrated embodiment, the nesting device comprises three channel members 184 and an upright flange 186 for holding a generally L-shaped finished product, which could be a vehicle front end or the like.

Figure 12:
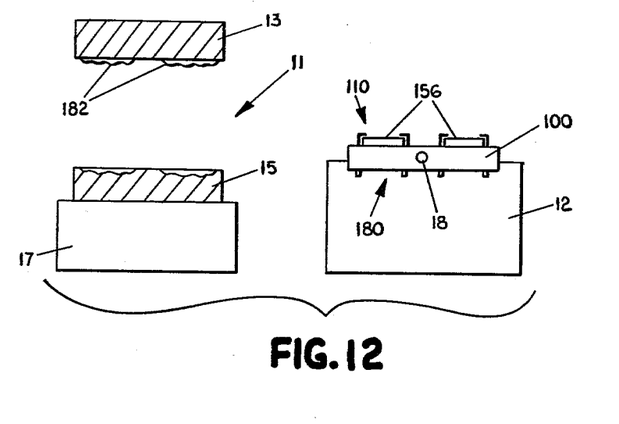
Figure 13:
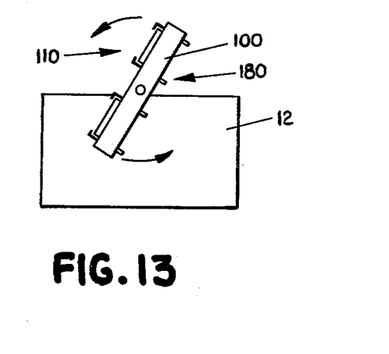
FIG. 13 showing the rotation of the blank holding mechanism through an angle of 180 degrees.
Figures 14, 15:
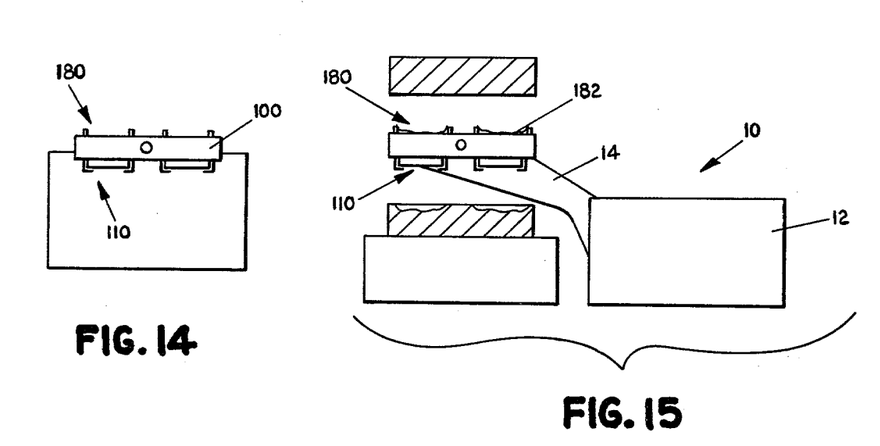
FIG. 14 showing the blank holding mechanism in its upside down position.
FIG. 15 showing the blank holding mechanism in its extended position and having received finished products on the upper side thereof.
Figure 16:
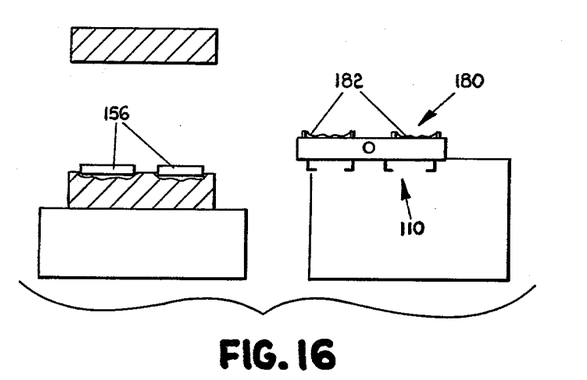
FIG. 16 showing the blanks in position to be compressed and the blank holding mechanism in its retracted position with the finished products on the top of a blank holding mechanism.

The operation of the apparatus of the present invention is shown schematically in FIGS. 12–16. In FIG. 12, the charge holding mechanism is shown in its retracted position, with the die halves open. The first step after loading the charge holding mechanism with unformed blanks or charges and closing the clamps on the charges is the rotation of the table 180 degrees in the manner shown in FIG. 13. After rotation, the charges clamped to the table occupy the position shown in FIG. 14. The movable carriage is then moved to its extended position wherein the blank holding apparatus is positioned between the open die halves in alignment with the mold cavities in the die, as shown in FIG. 15. Finished products are ejected from the upper die half, where they are carried when the die is opened, and these drop downwardly into the nesting device on the top of the inverted table. The clamps on the underside of the table are released and the ejector cylinder is actuated to permit the blanks to drop down into the respective mold cavities and to wedge the blanks into the mold cavities. The blank holding mechanism is then retracted as shown in FIG. 16 so that the finished parts can be removed from the blank holding mechanism and the new blanks can be compressed in the press. The table is then rotated back 180 degrees and reloaded with unformed blanks or charges.

This whole operation is controlled by an operator standing beside the press, without the operator having to reach between the open halves of the die. As shown in FIG. 1, the entire operation of the automatic loading and unloading device can be controlled by a control panel 190 mounted on a pedestal 192 having a base 194. The control panel includes appropriate controls 196 for operating all of the various functions of the apparatus described above. The only thing that the operator has to do is to manually load the charges into the gripping mechanism and to manually remove the products from the nesting device, all of which can be accomplished without the operator reaching into the die cavity itself.

The entire operation of the present invention is accomplished by means of hydraulic, pneumatic, and electrical circuitry, which is conventional. A control cabinet 198 includes a hydraulic drive motor 200 mounted in the lower portion thereof and appropriate hydraulic hoses 202 (shown schematically) leading from the cabinet to the loading and unloading apparatus. The upper portion of the cabinet includes the remaining controls 204 for operating the apparatus.

As noted previously, the various clamps for holding the charges to the rotatable table are operated pneumatically, whereas the drive cylinder for rotating the table and the drive cylinder for moving the movable carriage are operated hydraulically. The various hydraulic and pneumatic controls are believed to be conventional and need not be shown in detail.

It should be understood that the foregoing embodiment is merely illustrative of the preferred practice of the present invention and the various changes and modifications may be made in the arrangements and details of construction of the embodiments described and shown herein without departing from the spirit and scope of the present invention.

The embodiments of the invention in which an exclusive property or privilege are claimed are defined as follows:

1. Apparatus for automatically loading and unloading a compression press wherein products are formed by compressing blanks between upper and lower die halves that are vertically movable with respect to each other to open and close the die, said apparatus comprising:
 a frame adapted to be positioned adjacent the press;
 blank holding means pivotably mounted in the frame for rotation about a horizontal axis through an angle of at least 180 degrees, the blank holding means including releasable gripping means for engaging and holding the blanks when they are laid on the blank holding means, such that the blanks are releasably retained in place on the blank holding means when the blank holding means is rotated so as to be turned upside down, said blank holding means being longitudinally movable with respect to the frame between a retracted position, wherein the blank holding means is withdrawn from the press, and an extended position, wherein the blank holding means is extended to a position between the separated halves of the die in alignment with the mold cavities in the die; and
 control means for actuating the gripping means after uncompressed blanks are placed on the blank holding means, said control means turning the blank holding means upside down when loaded with uncompressed blanks and extending the loaded blank holding means into its extended position in alignment with the mold cavities in the die when the die halves are separated, the control means thereafter releasing the gripping means such that the blanks drop down on the lower die half in position to be compressed, the control means thereafter withdrawing the blank holding means to its retracted position and turning the blank holding means right side up for receipt of additional unformed blanks.

2. Apparatus according to claim 1 and further comprising nesting means on the underside of the blank holding means, such that when the blank holding means is turned upside down and is in position to deposit unformed blanks into the empty mold cavities in the lower die half, the nesting means faces upwardly and is in position to receive finished products that are ejected downwardly from the upper die half, the nesting means carrying the finished products away from the press as the blank holding means is moved to its retracted position.

3. Apparatus according to claim 2 wherein the gripping means include remotely controlled clamps for holding the blanks in place in the blank holding means, the clamps being remotely releasable to release the blanks when the blank holding means is in its extended position.

4. Apparatus according to claim 3 wherein the clamps include pivotal clamping members that are operated by at least one pneumatic drive cylinder acting through a mechanical linkage mechanism, such that extension and retraction of the output shaft of the drive cylinder causes the clamping members to open and close.

5. Apparatus according to claim 1 wherein the gripping means include vertical blank gripping means for holding blanks in a vertical position, said vertical blank gripping means including a pair of opposed side walls that taper downwardly and inwardly so as to engage and hold a blank as it is pressed downwardly into the tapered cavity between the tapered sidewalls, the vertical blank gripping means including pneumatically operated ejection ram means for forcing the blank out of the gripping means and downwardly into the lower die half when the blank holding means has been turned upside down and moved to its extended position.

6. Apparatus according to claim 1 and further comprising remotely operated ejector means for positively thrusting the blanks downwardly into their respective mold cavities when the blank holding means is in its extended position and the gripping means is released.

7. Apparatus according to claim 6 wherein the ejector means include a vertically movable ram positioned for downward driving engagement with the blanks and pneumatically operated drive cylinder means for moving the ram.

8. Apparatus according to claim 1 wherein the blank holding means is rotated by means of a hydraulic cylinder actuating a rack and pinion gear drive mechanism and the blank holding mechanism is extended and retracted by means of a hydraulic extend motor operating a rack and pinion gear mechanism that is mounted in the apparatus so as to produce relative longitudinal movement between the blank holding means and the frame.

9. Apparatus according to claim 1 wherein the blank holding means include a movable carriage mounted for longitudinal, horizontal movement with respect to the frame and a rotatable table mounted on the movable carriage for pivotal movement about a horizontal axis through an angle of at least 180 degrees, the releasable gripping means being mounted on one side of the table and nesting means for holding finished products being on the other side of the table, the nesting means receiving finished products ejected from the upper die half while the blank holding means is in its extended position, retraction of the blank holding means removing the finished products from the press.

10. Apparatus for loading and unloading a press, wherein products are formed by compressing unformed blanks between vertically movable die halves in a press, said apparatus comprising:

a frame adapted to be positioned adjacent the press;

a movable carriage mounted for horizontal movement with respect to the frame between extended and retracted positions;

extend drive means mounted in the apparatus for extending and retracting the movable carriage;

a blank holding table rotatably mounted in the movable carriage for rotation at least through an angle of 180 degrees about a horizontal axis, the table normally occupying a generally level position with a blank holding side facing upwardly and a nesting side facing downwardly when the table is in a right side up position, the table being rotatable to an upside down position wherein the blank holding side faces downwardly and the nesting side faces upwardly, the table being positioned in the movable carriage such that the table is moved horizontally into alignment with the mold cavities in the press when the movable carriage is extended and is moved out of alignment with the movable die halves when the movable carriage is retracted;

rotation drive means for rotating the table between its right side up and upside down positions;

gripping means mounted on the blank holding side of the table for releasably holding unformed blanks to the blank holding side of the table when the table is turned upside down;

remotely operated means for releasing the gripping means at least when the table is upside down and the movable carriage is extended, such that unformed blanks are transferred to the mold cavities in the lower die;

nesting means on the nesting side of the table for receiving finished products ejected downwardly from the upper die half when the movable carriage is extended, the nesting means holding the finished products while they are conveyed out of alignment with the die halves as the movable carriage is retracted; and control means for operating the respective means such that after the blank holding side of the table has been loaded with unformed blanks, the table is rotated to an upside down position and extended into alignment with the mold cavities, whereupon the blanks are released from the gripping means and transferred downwardly into the lower mold cavities while the finished products are received on the nesting means, the movable carriage thereafter being retracted such that the finished products can be removed and the table turned right side up for reloading.

11. Apparatus according to claim 10 wherein:

the frame includes a pair of inwardly facing channel members opposing each other on each side of the frame at an upper portion thereof and another pair of inwardly facing channels opposing each other on each side of the frame at a lower portion thereof, the channel members being parallel and aligned with the direction of longitudinal movement of the movable carriage, each channel member having a vertical back and horizontal upper and lower flanges that serve as tracks for the movable carriage, the inner surfaces of the upper and lower flanges having ridges extending therefrom and running longitudinally along the length of the flanges; and the movable carriage fits between the inwardly facing channels and rides in the channels by means of wheels extending outwardly from the movable carriage so as to ride along the horizontal flanges of the channel members, the movable carriage having at least one wheel riding along each channel member, the wheels having grooves formed about the outer periphery thereof that mate with the ridges on the flanges so as to positively maintain the wheels in fixed alignment in the channels.

12. Apparatus according to claim 10 wherein the extend drive means comprises an extend motor mounted in the movable carriage that turns a pinion gear in a plane parallel to the direction of movement of the movable carriage, the pinion gear being in engagement with an elongated rack gear mounted in the frame in a direction parallel to the direction of movement of the movable carriage, rotation of the pinion gear while in engagement with the rack producing the longitudinal movement of the movable carriage with respect to the frame.

13. Apparatus according to claim 10 wherein the rotation drive means comprises a hydraulic cylinder mounted in the movable carriage and having an output shaft that actuates a gear rack adjacent the axis of rotation of the table, the table including a pinion gear mounted in a fixed position with respect to the table for rotation about the axis of rotation of the table, the gear rack engaging the pinion gear and causing rotation of the table when the hydraulic cylinder actuates the gear rack.

* * * * *